US010250052B2

(12) United States Patent
Patil et al.

(10) Patent No.: US 10,250,052 B2
(45) Date of Patent: Apr. 2, 2019

(54) CHARGE RATE OPTIMIZATION FOR ENHANCED BATTERY CYCLE LIFE

(71) Applicant: QUALCOMM Incorporated, San Diego, CA (US)

(72) Inventors: Radhika Bharath Patil, Bangalore (IN); Arvindh Rajasekaran, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/958,841

(22) Filed: Dec. 3, 2015

(65) Prior Publication Data

US 2017/0163046 A1 Jun. 8, 2017

(51) Int. Cl.
*H02J 7/00* (2006.01)
*H01M 10/44* (2006.01)
*H02J 7/04* (2006.01)

(52) U.S. Cl.
CPC ........... *H02J 7/0052* (2013.01); *H01M 10/44* (2013.01); *H02J 7/0073* (2013.01); *H02J 7/045* (2013.01)

(58) Field of Classification Search
CPC ...................................... H02J 7/007
USPC ........................................ 320/139
See application file for complete search history.

(56) References Cited

U.S. PATENT DOCUMENTS

| 7,825,636 | B2 | 11/2010 | Partin et al. | |
|---|---|---|---|---|
| 7,834,593 | B2* | 11/2010 | Johnson | H01M 10/443 320/150 |
| 8,237,410 | B2 | 8/2012 | Young et al. | |
| 9,509,358 | B1* | 11/2016 | Shaffer | H04B 1/3883 |
| 9,705,351 | B2* | 7/2017 | Johnson, Jr. | H02J 7/007 |
| 2008/0048614 | A1* | 2/2008 | Partin | H02J 7/0073 320/116 |
| 2009/0140698 | A1* | 6/2009 | Eberhard | H02J 7/045 320/152 |
| 2009/0206797 | A1* | 8/2009 | Chueh | H02J 7/041 320/150 |
| 2010/0289457 | A1* | 11/2010 | Onnerud | H02J 7/0093 320/162 |
| 2011/0071780 | A1* | 3/2011 | Tarkoma | G01R 31/3679 702/63 |
| 2011/0236751 | A1* | 9/2011 | Amiruddin | H01M 4/0447 429/188 |
| 2014/0002006 | A1* | 1/2014 | Zhang | H02H 7/18 320/107 |
| 2014/0184163 | A1 | 7/2014 | Das et al. | |
| 2015/0145480 | A1* | 5/2015 | Yebka | H02J 7/0047 320/112 |
| 2016/0359339 | A1* | 12/2016 | Hwang | H02J 7/0047 |

(Continued)

FOREIGN PATENT DOCUMENTS

CN 100369352 C 2/2008

*Primary Examiner* — Suchin Parihar
(74) *Attorney, Agent, or Firm* — Arent Fox, LLP

(57) ABSTRACT

A method, an apparatus, and a computer-readable medium for battery charging are provided. The apparatus determines a level of a charge current for charging a battery based on a user preference. The apparatus determines a number of rest periods in the charge current, wherein during the rest periods, the apparatus is configured to perform at least one of setting the charge current to zero or discharging the battery. The apparatus charges the battery with the determined level of the charge current and the determined number of rest periods.

30 Claims, 10 Drawing Sheets

(56) References Cited

U.S. PATENT DOCUMENTS

| | | |
|---|---|---|
| 2017/0077720 A1* | 3/2017 | Aronov .................... H02J 7/007 |
| 2017/0133861 A1* | 5/2017 | Johnson, Jr. .......... H02J 7/0047 |
| 2017/0229891 A1* | 8/2017 | Lee ........................ H02J 7/047 |
| 2017/0288420 A1* | 10/2017 | Johnson ................ H02J 7/0047 |
| 2017/0331309 A1* | 11/2017 | Gofman ............. A61B 5/14532 |
| 2018/0034284 A1* | 2/2018 | Yebka ..................... H02J 7/007 |

* cited by examiner

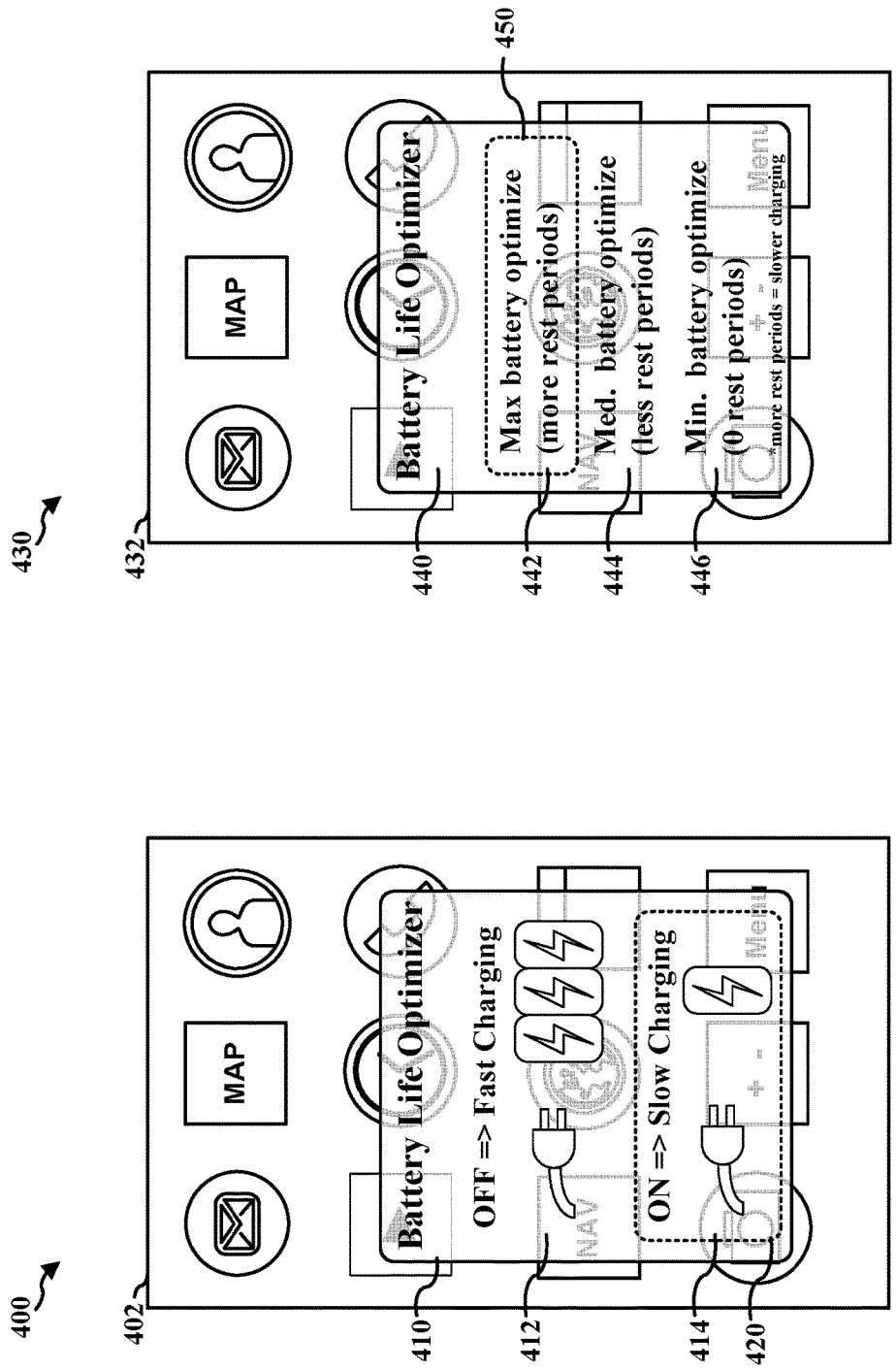

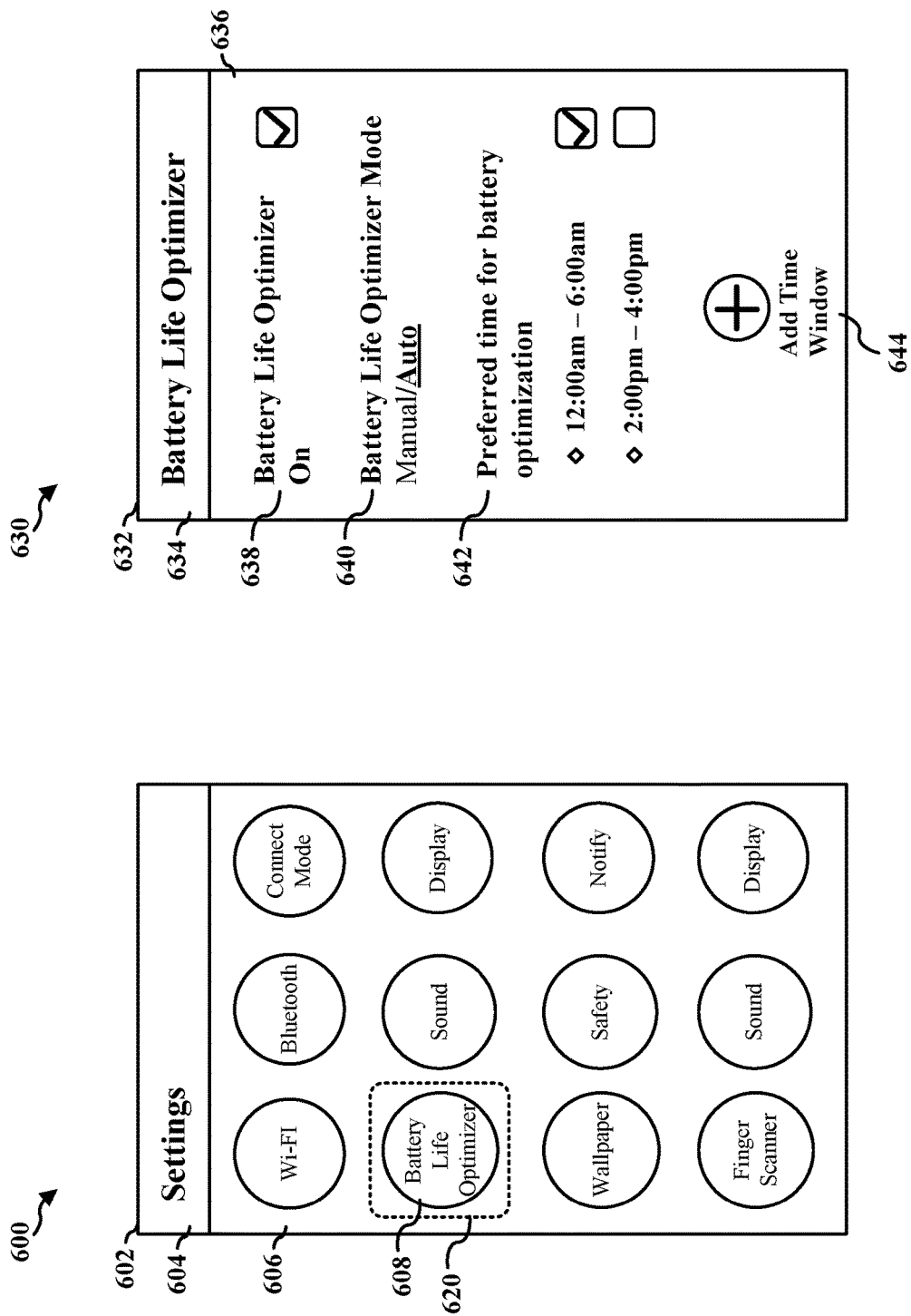

CHARGE RATE OPTIMIZATION FOR ENHANCED BATTERY CYCLE LIFE

BACKGROUND

Field

The present disclosure relates generally to battery charging systems, and more particularly, to controlling battery charging to optimize a battery cycle life.

Background

Rechargeable batteries are advantageous in that the same batteries may be used repeatedly by recharging the batteries. With increased use of electronics, there has been increase in use of rechargeable batteries. For example, mobile devices rely on rechargeable batteries to power the mobile devices. The life of a rechargeable battery is not permanent, and may be affected by variety of factors. In particular, the battery may deteriorate over time due to repeated uses and recharging. A user generally prefers to use one battery for as long as the user can before the battery becomes ineffective. Further, a user generally prefers to a long battery life per charge, such that the user may avoid frequent recharging of the battery. Therefore, there is a demand to increase a cycle life of a rechargeable battery (e.g., reduce aging of the rechargeable battery) and to maximize a battery life per charge.

SUMMARY

In an aspect of the disclosure, a method, a computer-readable medium, and an apparatus are provided. The apparatus determines a level of a charge current for charging a battery based on a user preference. The apparatus determines a number of rest periods in the charge current, wherein during the rest periods, the apparatus is configured to perform at least one of setting the charge current to zero or discharging the battery. The apparatus charges the battery with the determined level of the charge current and the determined number of rest periods.

In another aspect, the apparatus includes a memory and at least one processor coupled to the memory and configured to: determine a level of a charge current for charging a battery based on a user preference, determine a number of rest periods in the charge current, where during the rest periods, the at least one processor is configured to perform at least one of setting the charge current to zero or discharging the battery, and charge the battery with the determined level of the charge current and the determined number of rest periods.

In another aspect, the apparatus includes means for determining a level of a charge current for charging a battery based on a user preference, means for determining a number of rest periods in the charge current, where during the rest periods, the apparatus is configured to perform at least one of setting the charge current to zero or discharging the battery, and means for charging the battery with the determined level of the charge current and the determined number of rest periods.

In another aspect, the computer readable medium storing computer executable code for battery charging by an apparatus includes code for: determining a level of a charge current for charging a battery based on a user preference, determining a number of rest periods in the charge current, where during the rest periods, the apparatus is configured to perform at least one of setting the charge current to zero or discharging the battery, and charging the battery with the determined level of the charge current and the determined number of rest periods.

BRIEF DESCRIPTION OF THE DRAWINGS

FIGS. 4A and 4B are example diagrams of a user interface provided by a device to select various charging schemes, according to an aspect of the disclosure.

FIGS. 6A and 6B are example diagrams for user interfaces of a device that are used to schedule a time period for battery optimization.

DETAILED DESCRIPTION

Figure 1:
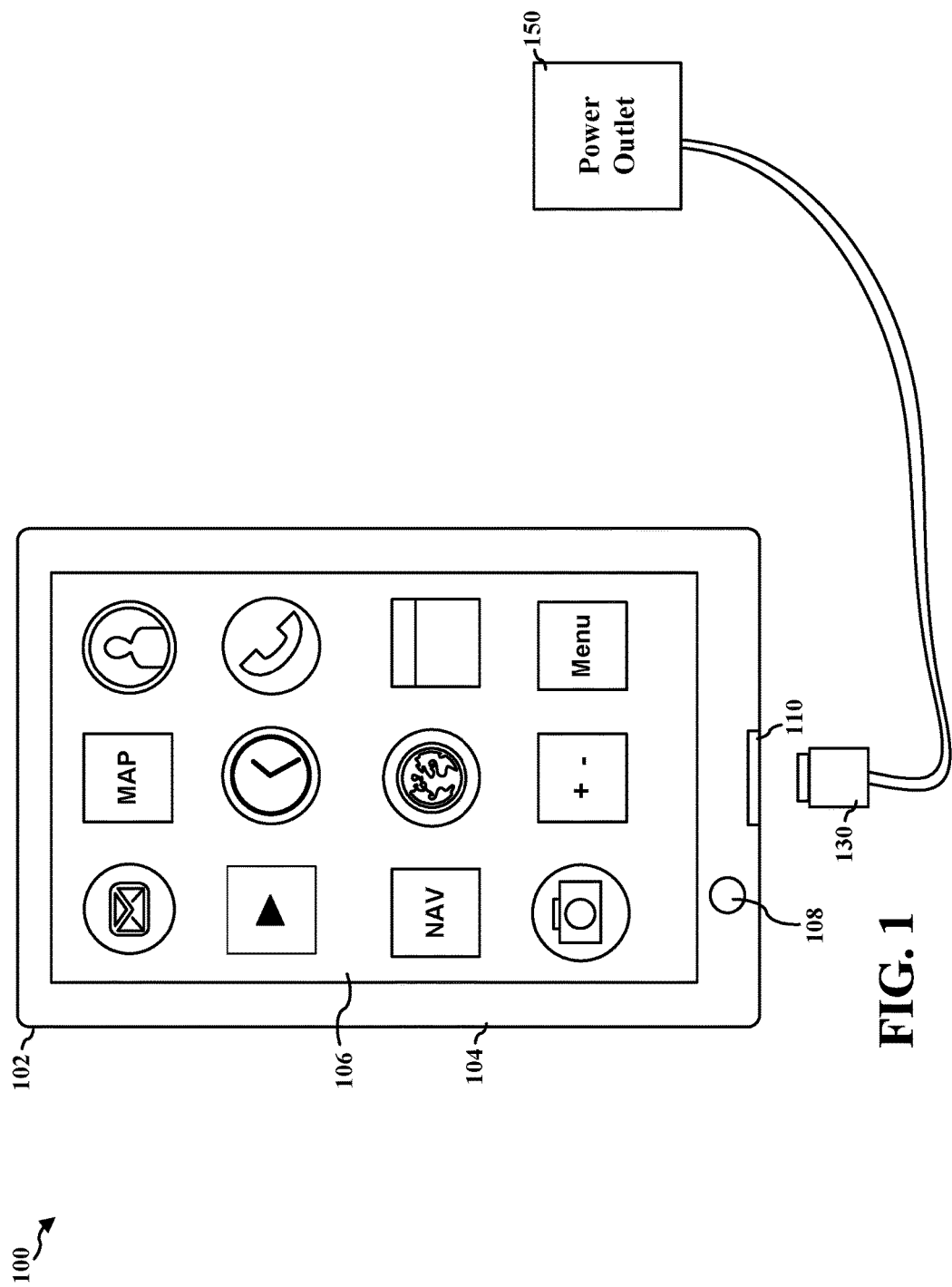
FIG. 1 is an example diagram 100 illustrating a device 102 powered by a rechargeable battery.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of battery charging systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

A new battery has a certain capacity when fully charged. However, the battery capacity may decrease after repeated recharging of the battery. For example, a battery for a device may last long when the battery is new, but after numerous recharging operations of the battery, the battery may not last as long as when the battery is new. In particular, because chemical reactions take place within the battery during recharging of the battery, the battery may age over time due to repeated charging of the battery and discharging of the battery to power the device. For example, a battery cycle life is generally used as a measure of battery's life. The battery cycle life is defined as the number of complete charge/discharge cycles a battery can perform before the battery's capacity falls below 80% of the battery's initial capacity. As a user uses a device with a battery, due to repeated charging/discharging of the battery, the battery usually ages and the battery's capacity decreases over time. Thus, an approach to increase the battery cycle life is desired.

FIG. 1 is an example diagram 100 illustrating a device 102 powered by a rechargeable battery. The device 102 may be a mobile device. The device 102 includes a main frame 104 and a display screen 106. The display screen 106 may display a user interface with various icons for respective software applications. The display screen 106 may be a touch screen display that enables a user to touch the display screen 106 to select menu items or icons on the user interface displayed on the display screen 106. The device 102 may include one or more physical buttons (e.g., a physical button 108) for performing certain functions. The device 102 includes a charging port 110 to connect to a battery charger, in order to charge a battery (not shown) included in the device 102. The battery may be, for example, a lithium-ion battery. A user may connect a battery charger 130 to the charging port 110 of the device 102 in order to charge the battery. The battery charger 130 may be connected to a power outlet 150 (e.g., a wall socket) to draw electricity to the device 102 via the battery charger 130 and the charging port 110, so as to charge the battery of the device 102.

Generally, a device charges a battery at a fixed charge rate (e.g., via a fixed charge current). The battery in the device generally follows a specific charge profile for the device, where the charge profile may indicate that a constant current should be supplied to the battery. Although a battery may be charged faster with a high charge current than with a low charge current, charging a battery with a constant high charge current may reduce battery's life and the battery's effective usable capacity. In particular, with repeated charging using a high charge current, battery performance may deteriorate faster over time and thus the usable capacity of the battery may reduce more significantly over time, than when a low charge current is used for charging the battery.

For example, although a higher charge current may be able to charge a battery faster than a lower charge current, the higher charge current may cause the following issues. If the charge current supplied to a battery to charge the battery is a constant high current, an undesirable phenomenon such as lithium plating may occur. For example, if a high current is supplied to a lithium ion battery, lithium ions may not be accommodated quickly enough between intercalation layers of the anode due to an excessive current. As a result, the lithium ions may accumulate on a surface of the anode where the lithium ions are deposited as metallic lithium, thus causing lithium plating. Because the lithium plating is a result of free lithium ions being deposited as metallic lithium, the lithium plating reduces a number of free lithium ions, and thus causes irreversible capacity loss of the battery. The faster the chemical reaction at the battery is, the more the lithium plating is likely to occur. Because the speed of the chemical reaction in the battery is directly proportional to the magnitude of the charge current, a higher charge current causes a faster chemical reaction in the battery that causes more lithium plating than a lower charge current, resulting faster loss of the battery capacity. In addition, continuing to supply electrical charge (e.g., via a high charge current) to a battery cell faster than the chemicals in the battery can react to the electrical charge may cause local overcharge conditions near electrodes in the battery, thereby damaging the cell. The overcharge conditions may include at least one of polarization, overheating, or unwanted chemical reactions. Further, if the battery is charged with a high charge current that causes more chemical reactions in the battery than a lower charge current, there may not be sufficient time for the chemical reactions in the battery to stabilize if the high charge current is continuously supplied without a break. Not providing sufficient time for the chemical reactions in the battery to stabilize may cause a reduced battery cycle life. Therefore, a battery charging scheme to optimize the life of the battery and/or to reduce capacity loss of the battery is desired.

Figure 2:
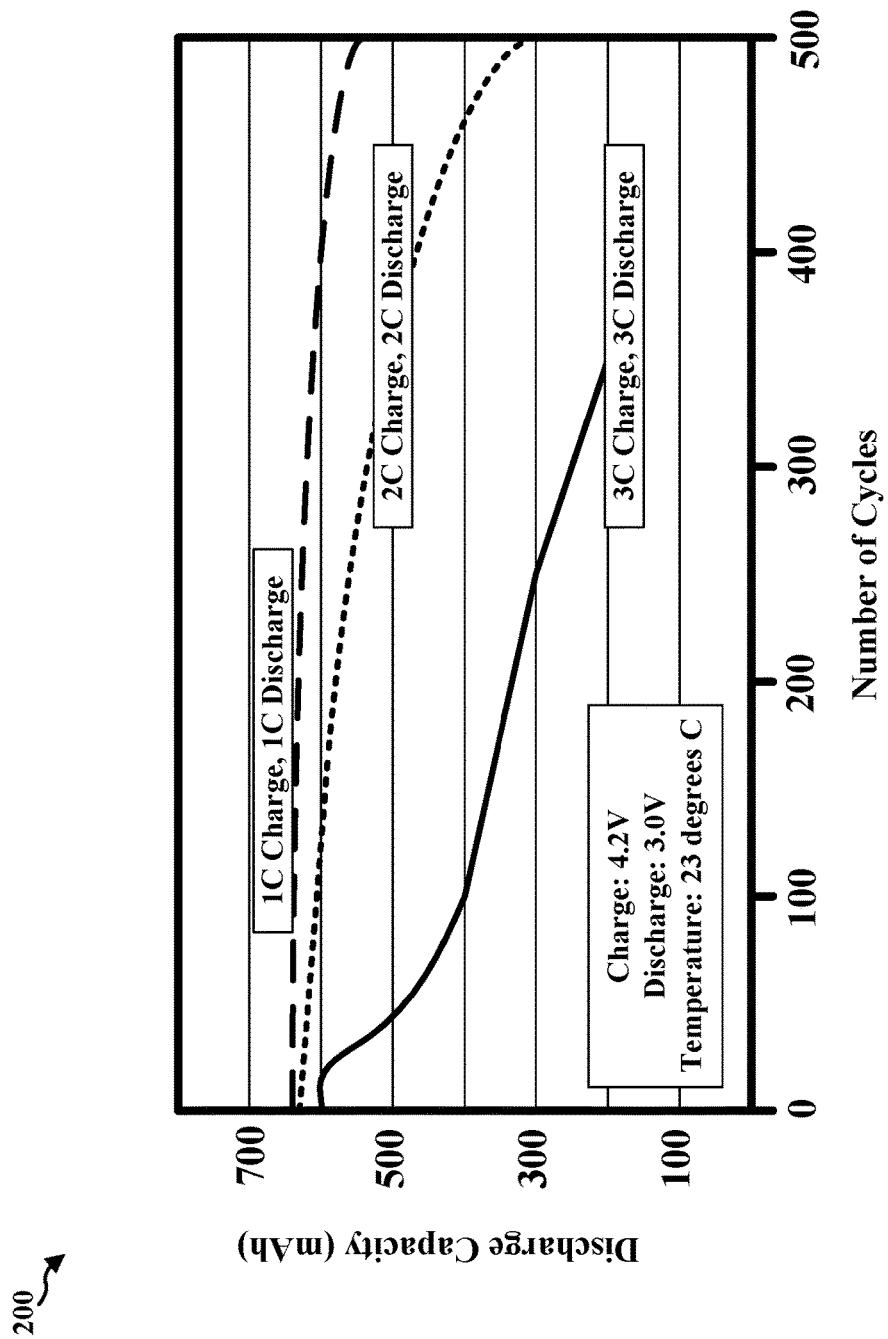
FIG. 2 is a diagram illustrating an example of an evolved Node B and user equipment in an access network.

FIG. 2 is an example plot 200 illustrating a battery cycle life versus a battery discharge capacity for various charge/discharge situations. The example plot 200 may be based on a plot from the Journal of Power Sources, September 2002, shown at http://www.mpoweruk.com/life.htm#unconventional. In the example plot 200, the charge voltage is 4.2V, the discharge voltage is 3.0V, and the temperature is at 23 degrees Celsius. As shown in the example plot 200, with less electric charge/discharge, the discharge capacity of the battery decreases less significantly, as the number of battery cycles increases. Hence, the example plot 200 illustrates that if the battery is charged using a higher current, the discharge capacity of the battery decreases more significantly, as the number of battery cycles increases. Therefore, the example plot 200 illustrates that charging a battery with a lower current may be desired for a better cycle life of a battery than charging with a higher current.

According to the disclosure, various charging schemes for a battery of a device may be provided to optimize the cycle life of the battery. For example, according to the disclosure, the device may charge the battery using a slow charging scheme (e.g., using a low current) to optimize the cycle life of the battery when charging the battery using a fast charging scheme (e.g., using a high current) is not desired according to a user preference. As discussed above, a high charge current may cause lithium plating and/or overcharge conditions. Further, failure to provide sufficient time for the battery's the chemical reactions to settle may cause a reduced battery cycle life. Therefore, according to the disclosure, the device provides a charging scheme with an option that utilizes a lower charge current and/or an option to implement a number of rest periods (e.g., a number of rest periods per a set time period), where the charge current is zero or is close to zero during the rest periods to allow the chemical reactions in the battery to stabilize. The option that utilizes a lower charge current may be selected based on a user preference. The option that implements a number of rest periods may be selected based on a user preference. Thus, the device may set a level of the charge current and may set a number of rest periods based on user preferences, and then charge the battery according to the level of the set charge current and the number of set rest periods. The length of a rest period may be determined based on the battery chemistry and/or a charge current, to provide sufficient time for chemical reactions due to the charge current in the battery to stabilize. In one aspect, although the device may provide rest periods for the charge current when a low charge current is selected, the device may provide no rest period for the charge current if a high charge current is selected. In another aspect, the device may provide rest periods for the charge current regardless of the level of the charge current.

Charging a battery using a low charge current with rest periods may be beneficial for improving the cycle life of the battery. In particular, if the charge current is low, the chemical reactions in the battery may be able to keep pace with a rate of the electrical energy supplied to the battery to charge the battery. Further, if one or more rest periods exist in the charge current, the rest period may provide time for the chemical reactions to stabilize. In particular, the one or more rest periods provide time to complete the ion transportation and to allow the chemical reactions to stabilize, which reduces stress on battery cells and improves the cycle life of the battery and the battery life. Thus, by using a low charge current (e.g., thus slow charging the battery) with rest periods, the chemical reactions within the battery may have more time to properly convert the electrical energy of the low charge current to a chemical energy to be stored in the battery.

Charging a battery using the low charge current with rest periods may also be beneficial in estimating a state of charge (SoC) of the battery, where the SoC may be shown in the user interface of a device as a charged percentage of the battery. In other words, charging the battery at a slower rate with rest periods may allow more accurate estimation of the SoC of the battery. In particular, charging the battery at a slower rate will result in collection of a higher number of samples for the SoC estimation by a current analog-to-digital converter (ADC), where the collected samples are used by a battery fuel gauge for coulomb counting to estimate the SoC. The higher number of samples results in better accuracy in the SoC estimation at least because random noises may be averaged more by utilizing the higher number of samples. In addition, during the rest periods while the battery is being charged (and the device is not being used), the device may read an open circuit voltage that may be used for SoC estimation.

As an example implementation, an example charging scheme according to the disclosure may include a battery life optimization profile and a fast charging profile. The battery life optimization profile may charge the battery with a low charge current (e.g., a charge current equivalent to 0.2 coulomb (C)) with rest periods. The fast charging profile may charge with the fastest permissible setting (e.g., a charge current equivalent to 0.5 C). It is noted that a current of 1 ampere is 1 coulomb of charge per second. In one aspect, the fast charging profile may not include a rest period. The selection between the battery life optimization profile and the fast charging profile may be made by a user selection or may be made automatically based on other predetermined preferences, such as a time of the day.

The device may consider various user preferences to determine a level of a charge current and/or a number of rest periods. According to an aspect of the disclosure, the device may provide a user-selectable menu that allows a user to select among different levels of a charge current when a battery charger is plugged into the device. For example, the device may provide a user-selectable menu to select between a fast charge mode (e.g., with a high charge current) and a slow charge mode (e.g., with a low charge current) when a battery charger is plugged into the device. The device may further provide a user-selectable menu to select a number of rest periods when the battery charger is plugged into the device. According to an aspect of the disclosure, a user may schedule on a device a time period for charging the battery using a slow charge mode with a low charge current and/or rest periods. The device may determine the time of the day (e.g., based on a network connected to the device), and may determine if it is time to use a high charge current or a low charge current based on the scheduled time period. For example, if a user generally lets the device charge while the user is sleeping from 12:00 am to 8:00 am, the user may set the slow charge time period to 12:00 am to 8:00 am, such that the device will charge the battery in a slow charge mode during such time period. In one example implementation, the device makes available a user interface to set time periods for slow charging when the battery optimization profile is selected.

Figure 3:
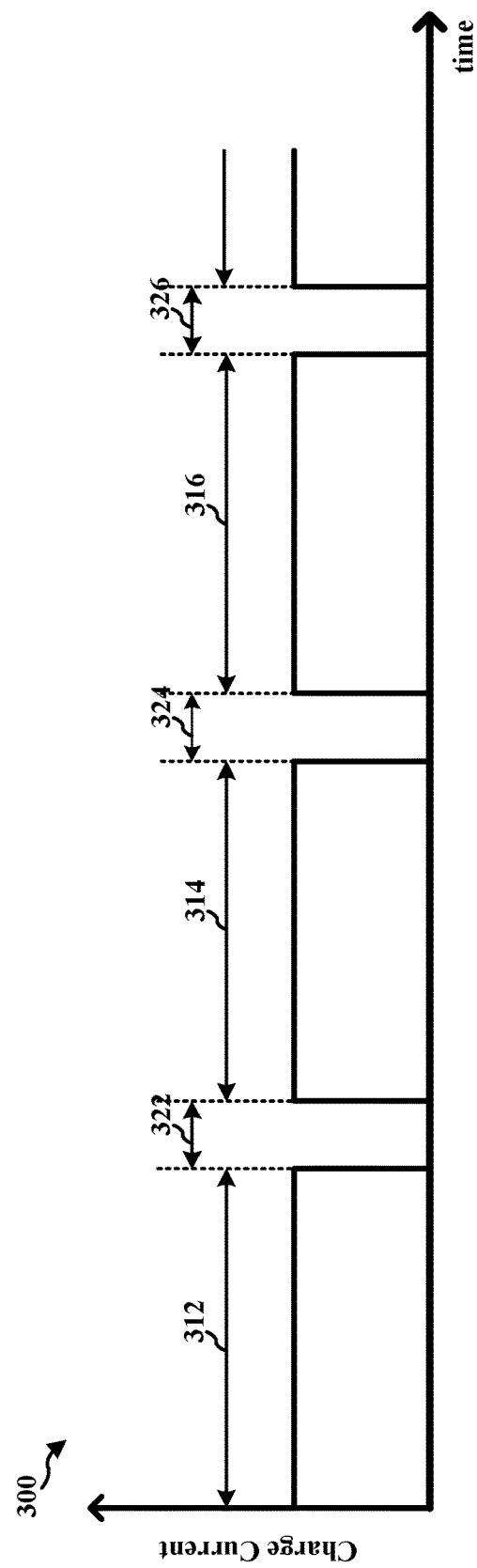
FIG. 3 is an example diagram illustrating a charge current with rest periods, according to an aspect of the disclosure.

The device may provide one or more rest periods according to at least one of the following approaches. According to a first approach, during each rest period, the device may set the charge current supplied to the battery to zero. For example, during each rest period, the device may turn off the charge current supplied to the battery. In particular, the device may have an internal switch configured to turn on or off the charge current supplied to the battery, where the device turns off the internal switch during each rest period. The internal switch may be an electrical circuit. The internal switch may be implemented as a part of an integrated circuit in the device. According to a second approach, during each rest period, the device may drain charge from the battery, thus discharging the battery. In one aspect, during each rest period, the device may turn off the charge current supplied to the battery and drain charge from the battery by discharging the battery to a load within the device. In another aspect, during each rest period, a charge current may continue to be supplied by the battery charger, and the device may discharge the same amount of charge as provided by the battery charger. FIG. 3 is an example diagram 300 illustrating a charge current with rest periods, according to an aspect of the disclosure. The x-axis represents the time and the y-axis represents the charge current. During the charge period 312, 314, and 316, the device supplies a continuous charge current to the battery. During the rest periods 322, 324, and 326, no current is supplied to the battery, allowing time for the chemical reactions in the battery to stabilize. As illustrated in the example diagram 300, the length of a rest period may be smaller than a length of a charge period.

FIGS. 4A and 4B are example diagrams of a user interface provided by a device to select various charging schemes. FIG. 4A is an example diagram 400 of a user interface providing a user-selectable options to optimize a battery life. In the example diagram 400, a user interface 402 of a device may display several icons that may be selected. In the example diagram 400, a battery life optimizer menu 410 is provided as an overlay menu to display charging options. The battery life optimizer menu 410 may be provided (e.g., as a pop-up menu) when a battery charger is plugged into the device. The charging options displayed on the battery life optimizer menu 410 are an optimizer-off option 412 to turn off the battery life optimizer by using the fast charging mode and an optimizer-on option 414 to turn on the battery life optimizer by using the slow charging mode. If the optimizer-off option 412 for fast charging is selected, the device charges the battery using the fast charging mode, by supplying a high charge current to the battery. If the optimizer-on option 414 for slow charging is selected, the device charges the battery using the slow charging mode, by supplying a low charge current to the battery. In the example diagram 400, a user may select the optimizer-on option 414 by highlighting the optimizer-on option 414 with a selection box 420.

FIG. 4B is an example diagram 430 of a user interface providing a user-selectable options to set a number of rest periods. In the example diagram 430, a user interface 432 of a device may display several icons that may be selected to set a number of rest periods. In the example diagram 430, a battery life optimizer menu 440 is provided as an overlay menu to display options to choose a number of rest periods. The rest period options displayed on the battery life optimizer menu 440 are a maximum battery optimization option 442 with a certain number of rest periods, a medium battery optimization option 444 with a number of rest periods less than the number of rest periods for the maximum battery optimization option 442, and a minimum battery optimization option 446 with no rest period. In the example diagram 430, a user has selected the maximum battery optimization option 442 by highlighting the maximum battery optimization option 442 with a selection box 450.

In an aspect, the user interface 432 may provide the battery life optimizer menu 440 when a user selects one of the optimizer-off option 412 and the optimizer-on option 414 of FIG. 4A, such that the user may select a number of rest periods for a selected option for a charging mode. In another aspect, the user interface 432 may provide the battery life optimizer menu 440 when a user selects the optimizer-on option 414 of FIG. 4A, to allow the user to select a number of rest periods, but may automatically supply a charge current without a rest period when a user selects the optimizer-off option 412 of FIG. 4A, without providing the user interface 432.

Figure 5A:
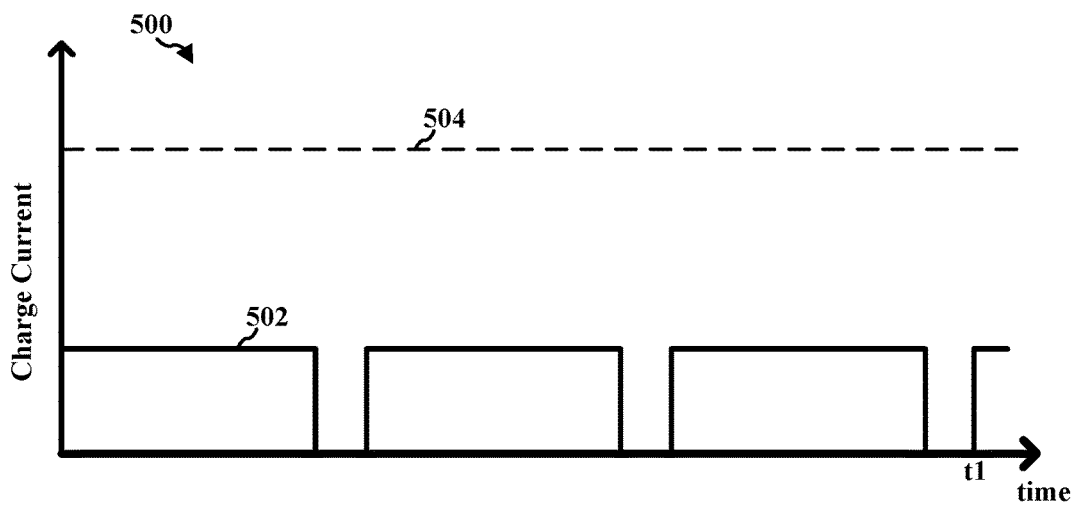
FIGS. 5A-5C are example diagrams illustrating a charge current with different numbers of rest periods.
Figure 5B:
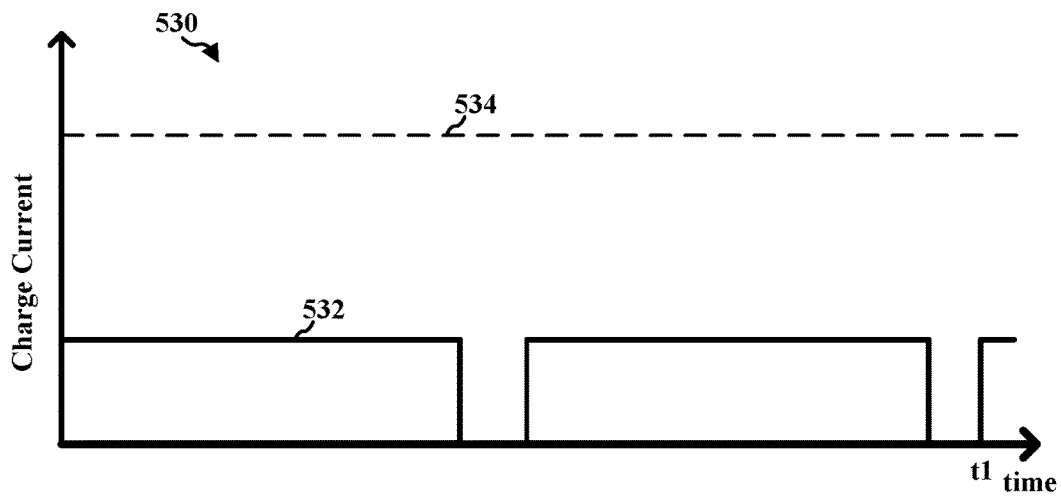
Figure 5C:
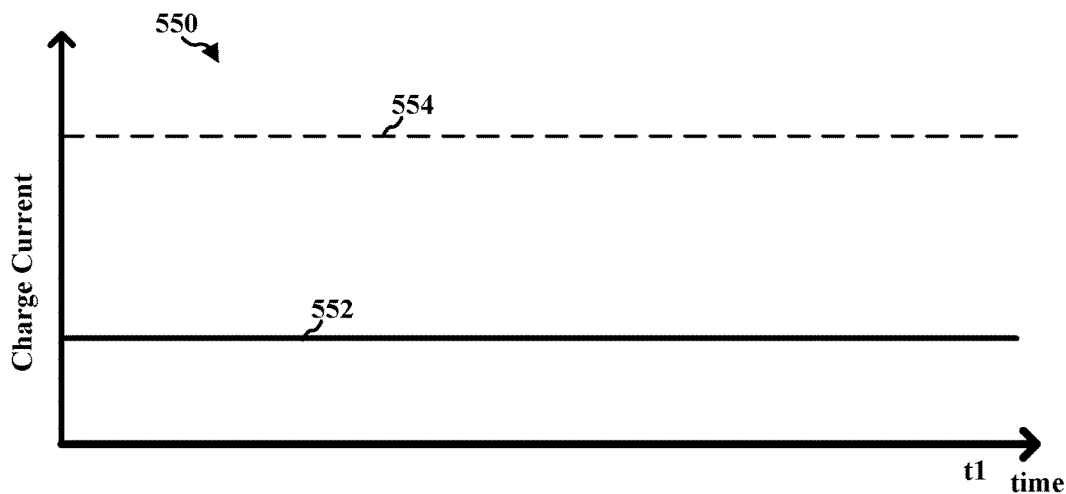

FIGS. 5A-5C are example diagrams illustrating a charge current with different numbers of rest periods. FIG. 5A is an example diagram 500 illustrating a charge current with a high number of rest periods. For example, when the user selects the optimizer-on option 414 of FIG. 4A and selects the maximum battery optimization option 442 of FIG. 4B, the device may supply a low charge voltage 502 with rest periods as shown in the example diagram 500. In the example diagram 500, there are three rest periods per set time period t1. It is noted that, the device may supply a continuous high charge current 504 if the user selects the optimizer-off option 412 of FIG. 4A for fast charging. FIG. 5B is an example diagram 530 illustrating a charge current with a low number of rest periods. For example, when the user selects the optimizer-on option 414 of FIG. 4A and selects the medium battery optimization option 444 of FIG. 4B, the device may supply a low charge voltage 532 with rest periods as shown in the example diagram 530. In the example diagram 530, there are two rest periods per a set time period t1, which is less than three rest periods per a set time period t1 shown in FIG. 5A. It is noted that, the device may supply a continuous high charge current 534 if the user selects the optimizer-off option 412 of FIG. 4A for fast charging. FIG. 5C is an example diagram 550 illustrating a charge current without a rest period. For example, when the user selects the optimizer-on option 414 of FIG. 4A and selects the minimum battery optimization option 446 of FIG. 4B, the device may supply a low charge voltage 552 without a rest period as shown in the example diagram 550. It is noted that, the device may supply a continuous high charge current 554 if the user selects the optimizer-off option 412 of FIG. 4A for fast charging.

FIGS. 6A and 6B are example diagrams for user interfaces of a device that are used to schedule a time period for battery optimization. FIG. 6A is an example diagram 600 of a user interface providing a settings menu. In the example diagram 600, a user interface 602 of a device displays a title 604 showing "Settings" to indicate a settings menu, and further displays several user-selectable icons on the main portion 606 such that a user can select an icon to configure settings associated with the icon. In the example diagram 600, a user may select a battery-life-optimizer icon 608 by highlighting the battery-life-optimizer icon 608 with a selection box 620, to configure settings for battery life optimization.

FIG. 6B is an example diagram 630 of a user interface providing a battery life optimizer menu. In the example diagram 630, a user interface 632 of a device displays a title 634 showing "Battery Life Optimizer" to indicate a battery life optimizer menu. The main portion 636 of the user interface provides various options that a user may set for battery life optimization. In particular, the main portion 636 provides a battery life optimizer activation option 638. In the example diagram 630, the battery life optimizer activation option 638 is checked, and thus the battery life optimizer function is turned on. The main portion 636 provides a battery life optimizer mode option 640 to set whether the battery life optimization should be performed manually or automatically. In the example diagram 630, the battery life optimizer mode is set to "auto." If the battery life optimizer mode is set to "manual," the battery life optimization is performed when a user manually selects battery life optimization. If the battery life optimizer mode is set to "auto," then the battery life optimization is automatically performed during a preferred time period. The main portion 636 provides the time preference option 642 to set a preferred time for battery life optimization. In the example diagram 630, the preferred time that is set and checked is 12:00 pm-6:00 pm, and thus the device will automatically perform battery life optimization during the preferred time of 12:00 am-6:00 am. In the example diagram 630, although another preferred time is set for 2:00 pm-4:00 pm, such preferred time is not checked, and thus the device will not automatically perform battery life optimization for 2:00 pm-4:00 pm. The main portion 636 includes a time window adding option 644 to set an additional preferred time window.

Figure 7:
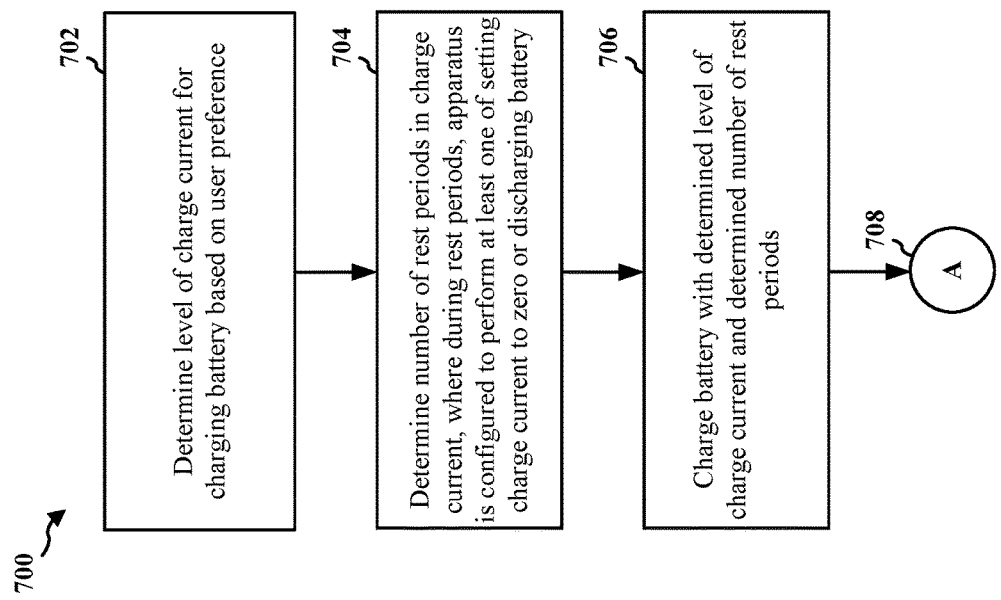
FIG. 7 is a flowchart of a method of battery charging.

FIG. 7 is a flowchart 700 of a method of battery charging. The method may be performed by a device (e.g., the device 102, the apparatus 902/902'). At 702, the device determines a level of a charge current for charging a battery based on a user preference. At 704, the device determines a number of rest periods in the charge current. In an aspect, during the rest periods, the device is configured to perform at least one of setting the charge current to zero or discharging the battery. For example, as discussed supra, the device provides a charging scheme with an option that utilizes a lower charge current and/or an option to implement a number of rest periods, where the charge current is zero or is close to zero during the rest periods to allow the chemical reactions in the battery to stabilize. For example, as discussed supra, the option that utilizes a lower charge current may be selected based on a user preference. For example, as discussed supra, the option that implements a number of rest periods may be selected based on a user preference.

At 706, the device charges the battery with the determined level of the charge current and the determined number of rest periods. For example, as discussed supra, the device may determine a level of the charge current and may determine a number of rest periods based on user preferences, and then charge the battery according to the level of the charge current and the number of rest periods. At 708, the device performs additional features as discussed infra.

In an aspect, the charge current has one or more charge periods with a continuous current and one or more rest periods, the each of the one or more rest periods being smaller than each of the one or more charge periods. For example, as discussed supra, during the charge period 312, 314, and 316, the device supplies a continuous charge current to the battery, and during the rest periods 322, 324, and 326, no current is supplied to the battery. For example, as discussed supra, the length of a rest period may be smaller than a length of a charge period.

In an aspect, when the determined level is a low level of the charge current, the charge current has one or more charge periods with a continuous current and has one or more rest periods, where during the one or more rest periods, the device is configured to perform at least one of setting the charge current to zero or discharging the battery. In such an aspect, when the determined level is a high level of the charge current, the number of the rest periods is determined to be zero. For example, as discussed supra, although the device may provide rest periods for the charge current when a low charge current is selected, the device may provide no rest period for the charge current if a high charge current is selected.

In an aspect, a number of rest periods in the charge current is determined based on another user preference. In such an aspect, the number of rest periods is determined via a user-selectable option for the number of rest periods. For example, as discussed supra, for example, a user interface 432 of a device may display several icons that may be selected to set a number of rest periods.

In an aspect, the determining the level of the charge current based on the user preference comprises determining the level of the charge current based on a scheduled time. For example, as discussed supra, the device may determine the time of the day (e.g., based on a network connected to the device), and may determine if it is time to use a high charge current or a low charge current based on the scheduled time period.

Figure 8:
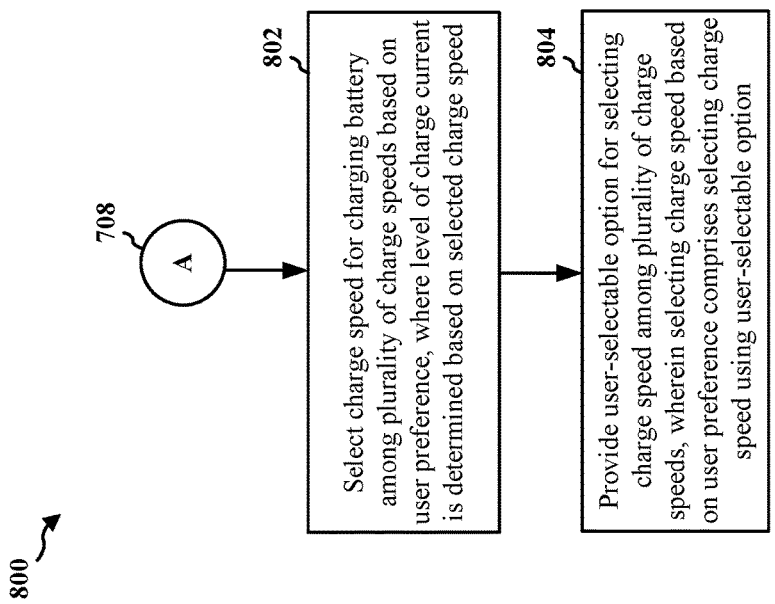
FIG. 8 is a flowchart of a method of battery charging, expanding from the flowchart of FIG. 7.

FIG. 8 is a flowchart 800 of a method of battery charging, expanding from the flowchart 700 of FIG. 7. The method may be performed by a device (e.g., the device 102, the apparatus 902/902'). At 708, the device continues from the flowchart 700 of FIG. 7. At 802, the device selects a charge speed for charging a battery among a plurality of charge speeds based on the user preference, where the level of the charge current is determined based on the selected charge speed. In an aspect, if a low charge speed is selected, a low level of the charge current is determined for charging the battery, and if a high charge speed is selected, a high level of the charge current is determined for charging the battery. At 804, the device may provide a user-selectable option for selecting the charge speed among the plurality of charge speeds, where the selecting the charge speed based on the user preference comprises selecting the charge speed using the user-selectable option. In an aspect, the user-selectable option is provided upon determination that a battery charger is connected to the apparatus. For example, as discussed supra, the charging options displayed on the battery life optimizer menu 410 are an optimizer-off option 412 to turn off the battery life optimizer by using the fast charging mode and an optimizer-on option 414 to turn on the battery life optimizer by using the slow charging mode. For example, as discussed supra, if the optimizer-off option 412 for fast charging is selected, the device charges the battery using the fast charging mode, by supplying a high charge current to the battery. For example, as discussed supra, if the optimizer-on option 414 for slow charging is selected, the device charges the battery using the slow charging mode, by supplying a low charge current to the battery. For example, as discussed supra, the battery life optimizer menu 410 may be provided (e.g., as a pop-up menu) when a battery charger is plugged into the device.

Figure 9:
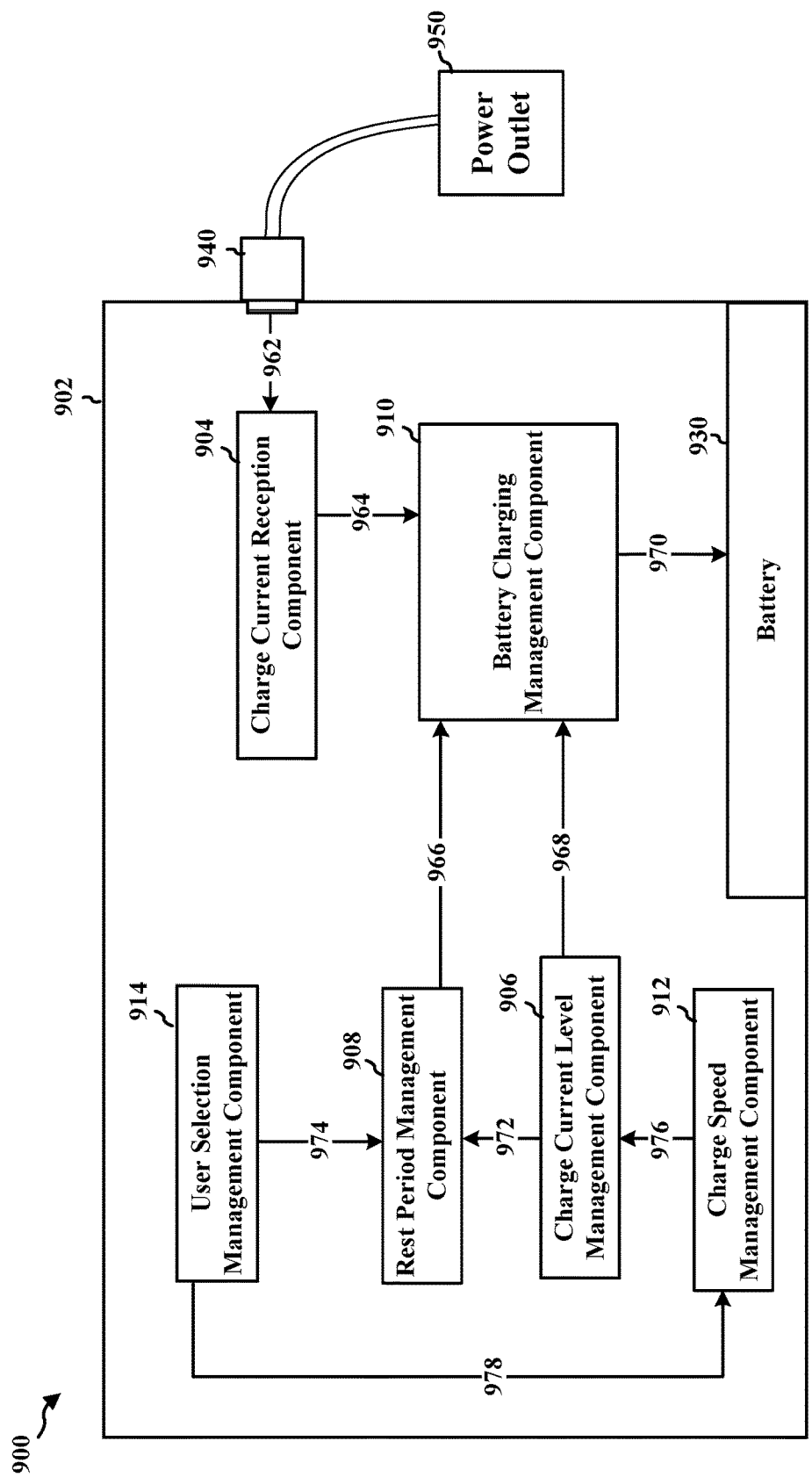
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a device such as a user device. The apparatus includes a charge current reception component 904, a charge current level management component 906, a rest period management component 908, a battery charging management component 910, a charge speed management component 912, a user selection management component 914. The apparatus includes a battery 930 that supplies power to the apparatus.

The charge current reception component 904 receives at 962 electricity supplied from a charger 940 connected to a power outlet 950, and forwards at 964 an electrical current to the battery charging management component 910. The charge current level management component 906 determines a level of a charge current for charging a battery (e.g., battery 930) based on a user preference, and may forward at 966 the determine level of the charge current to the battery charging management component 910. The rest period management component 908 determines a number of rest periods in the charge current, and may forward at 968 the determine number of rest periods to the battery charging management component 910. In an aspect, during the rest periods, the rest period management component 908 is configured to perform at least one of setting the charge current to zero or discharging the battery 930. The battery charging management component 910 charges the battery 930 with the determined level of the charge current and the determined number of rest periods, via 970.

In an aspect, the charge current has one or more charge periods with a continuous current and one or more rest periods, the each of the one or more rest periods being smaller than each of the one or more charge periods. In an aspect, when the determined level is a low level of the charge current, the charge current has one or more charge periods with a continuous current and has one or more rest periods, where during the one or more rest periods, the rest period management component 908 is configured to perform at least one of setting the charge current to zero or discharging the battery 930. In such an aspect, when the determined level is a high level of the charge current, the number of the rest periods is determined to be zero, via 972.

In an aspect, a number of rest periods in the charge current is determined based on another user preference. In such an aspect, the number of rest periods is determined via a user-selectable option for the number of rest periods (e.g., provided via the user selection management component 914 and via 974). In an aspect, the determining the level of the charge current based on the user preference comprises determining the level of the charge current based on a scheduled time.

The charge speed management component 916 selects a charge speed for charging the battery 930 among a plurality of charge speeds based on the user preference, where the level of the charge current is determined based on the selected charge speed, via 976. In an aspect, if a low charge speed is selected, a low level of the charge current is determined for charging the battery 930, and if a high charge speed is selected, a high level of the charge current is determined for charging the battery 930. The user selection management component 914 provides a user-selectable option for selecting the charge speed among the plurality of charge speeds, where the charge speed management component 912 selects the charge speed based on the user preference by selecting the charge speed using the user-selectable option (e.g., via the charge speed management component 912 and via 978). In an aspect, the user-selectable option is provided upon determination that a battery charger is connected to the apparatus.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
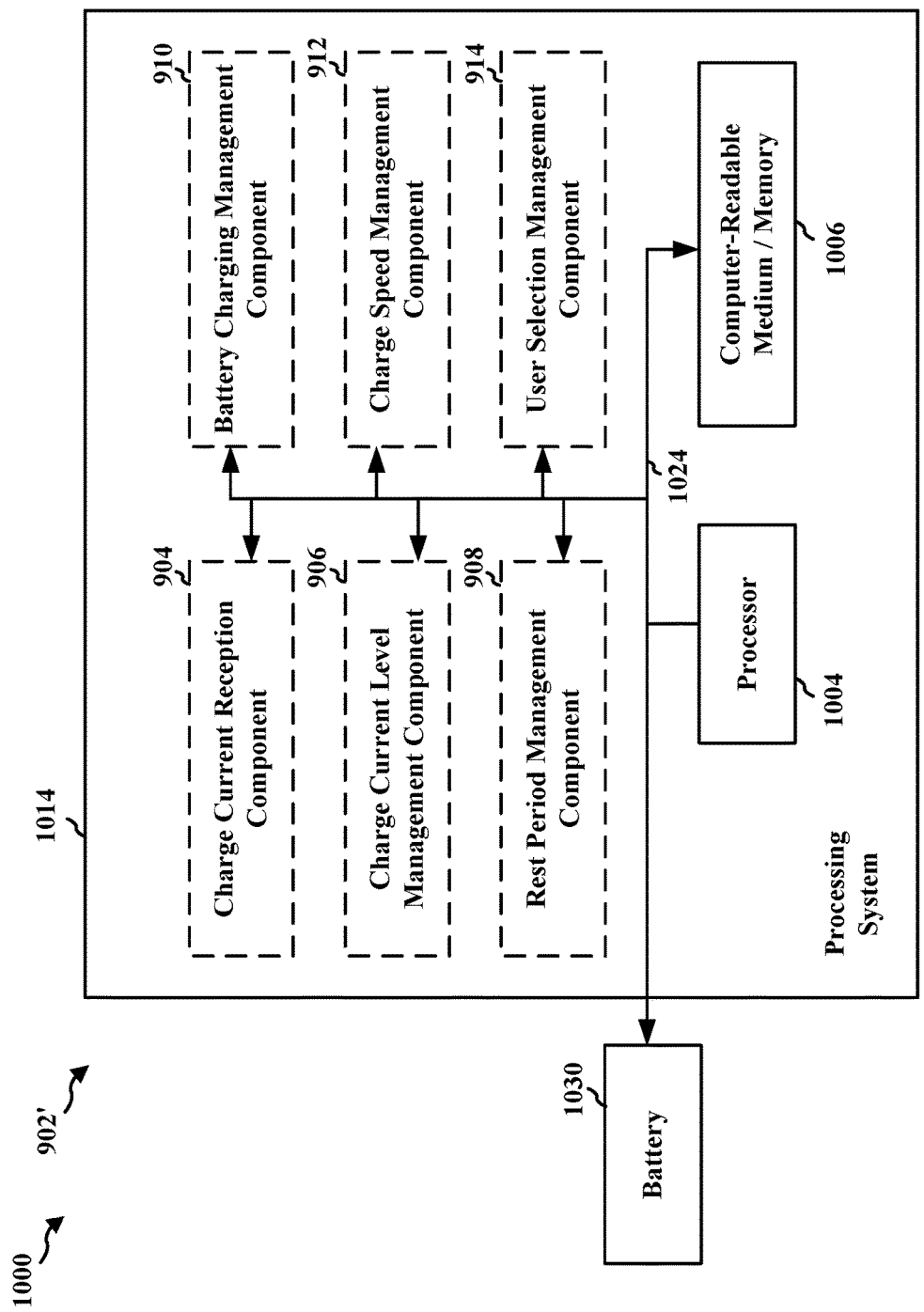
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a battery 1030. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, and 914. The components may be software components running in the processor 1004, resident/stored in the computer readable medium/memory 1006, one or more hardware components coupled to the processor 1004, or some combination thereof.

In one configuration, the apparatus 902/902' for battery charging includes means for determining a level of a charge current for charging a battery based on a user preference, means for determining a number of rest periods in the charge current, where during the rest periods, the apparatus 902/902' is configured to perform at least one of setting the charge current to zero or discharging the battery, and means for charging the battery with the determined level of the charge current and the determined number of rest periods. In an aspect, the apparatus 902/902' further includes means for selecting a charge speed for charging a battery among a plurality of charge speeds based on the user preference, where the level of the charge current is determined based on the selected charge speed. In an aspect, the apparatus 902/902' further includes means for providing a user-selectable option for selecting the charge speed among the plurality of charge speeds, where the selecting the charge speed based on the user preference comprises selecting the charge speed using the user-selectable option. The aforementioned means may be one or more of the aforementioned components of the apparatus 902 and/or the processing system 1014 of the apparatus 902' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of battery charging by an apparatus, comprising:
determining a level of a charge current to be used during a charging mode for charging a battery based on a user preference;
determining a number of rest periods to be used during the charging mode based on the user preference, wherein during the rest periods, the apparatus is configured to perform at least one of setting the charge current to zero or discharging the battery; and
charging the battery with the determined level of the charge current and the determined number of rest periods;
wherein, when the determined level is a low level of the charge current, the charge current has one or more charge periods with a continuous current and has one or more rest periods, and
wherein, when the determined level is a high level of the charge current, the number of the rest periods is determined to be zero.

2. The method of claim 1, wherein the charge current has one or more charge periods with a continuous current and one or more rest periods, each of the one or more rest periods being smaller than each of the one or more charge periods.

3. The method of claim 1,
wherein during the one or more rest periods, the apparatus is configured to perform at least one of setting the charge current to zero or discharging the battery.

4. The method of claim 1, wherein the number of rest periods is determined based on another user preference.

5. The method of claim 4, wherein the number of rest periods is determined via a user-selectable option for the number of rest periods.

6. The method of claim 1, wherein the determining the level of the charge current based on the user preference comprises determining the level of the charge current based on a scheduled time.

7. The method of claim 1, further comprising:
selecting a charge speed for charging the battery among a plurality of charge speeds based on the user preference,
wherein the level of the charge current is determined based on the selected charge speed.

8. The method claim 7, wherein if a low charge speed is selected, a low level of the charge current is determined for charging the battery, and
wherein if a high charge speed is selected, a high level of the charge current is determined for charging the battery.

9. The method of claim 7, further comprising:
providing a user-selectable option for selecting the charge speed among the plurality of charge speeds, wherein the selecting the charge speed based on the user preference comprises selecting the charge speed using the user-selectable option.

10. The method of claim 9, wherein the user-selectable option is provided upon determination that a battery charger is connected to the apparatus.

11. An apparatus for battery charging, comprising:
a memory; and
at least one processor coupled to the memory and configured to:
determine a level of a charge current to be used during a charging mode for charging a battery based on a user preference;
determine a number of rest periods to be used during a charging mode based on the user preference, wherein during the rest periods, the at least one processor is configured to perform at least one of setting the charge current to zero or discharging the battery; and
charge the battery with the determined level of the charge current and the determined number of rest periods;
wherein, when the determined level is a low level of the charge current, the charge current has one or more charge periods with a continuous current and has one or more rest periods,
wherein, when the determined level is a high level of the charge current, the number of the rest periods is determined to be zero.

12. The apparatus of claim 11, wherein the charge current has one or more charge periods with a continuous current and one or more rest periods, each of the one or more rest periods being smaller than each of the one or more charge periods.

13. The apparatus of claim 11,
wherein during the one or more rest periods, the at least one processor is configured to perform at least one of setting the charge current to zero or discharging the battery.

14. The apparatus of claim 11, wherein the number of rest periods is determined based on another user preference.

15. The apparatus of claim 14, wherein the number of rest periods is determined via a user-selectable option for the number of rest periods.

16. The apparatus of claim 11, wherein the determining the level of the charge current based on the user preference comprises determining the level of the charge current based on a scheduled time.

17. The apparatus of claim 11, wherein the at least one processor is further configured to:
select a charge speed for charging the battery among a plurality of charge speeds based on the user preference,
wherein the level of the charge current is determined based on the selected charge speed.

18. The apparatus claim 17, wherein if a low charge speed is selected, a low level of the charge current is determined for charging the battery, and
wherein if a high charge speed is selected, a high level of the charge current is determined for charging the battery.

19. The apparatus of claim 17, wherein the at least one processor is further configured to:
provide a user-selectable option for selecting the charge speed among the plurality of charge speeds, wherein the selecting the charge speed based on the user preference comprises selecting the charge speed using the user-selectable option.

20. The apparatus of claim 19, wherein the user-selectable option is provided upon determination that a battery charger is connected to the apparatus.

21. An apparatus for battery charging, comprising:
means for determining a level of a charge current to be used during a charging mode for charging a battery based on a user preference;
means for determining a number of rest periods to be used during a charging mode based on the user preference, wherein during the rest periods, the apparatus is configured to perform at least one of setting the charge current to zero or discharging the battery; and means for charging the battery with the determined level of the charge current and the determined number of rest periods;

wherein, when the determined level is a low level of the charge current, the charge current has one or more charge periods with a continuous current and has one or more rest periods, wherein, when the determined level is a high level of the charge current, the number of the rest periods is determined to be zero.

22. The apparatus of claim 21, wherein the charge current has one or more charge periods with a continuous current and one or more rest periods, each of the one or more rest periods being smaller than each of the one or more charge periods.

23. The apparatus of claim 21,
wherein during the one or more rest periods, the apparatus is configured to perform at least one of setting the charge current to zero or discharging the battery.

24. The apparatus of claim 21, wherein the number of rest periods is determined based on another user preference, and wherein the number of rest periods is determined via a user-selectable option for the number of rest periods.

25. The apparatus of claim 21, wherein the determining the level of the charge current based on the user preference comprises determining the level of the charge current based on a scheduled time.

26. The apparatus of claim 21, further comprising:
means for selecting a charge speed for charging the battery among a plurality of charge speeds based on the user preference,
wherein the level of the charge current is determined based on the selected charge speed.

27. The apparatus claim 26, wherein if a low charge speed is selected, a low level of the charge current is determined for charging the battery, and
wherein if a high charge speed is selected, a high level of the charge current is determined for charging the battery.

28. The apparatus of claim 26, further comprising:
means for providing a user-selectable option for selecting the charge speed among the plurality of charge speeds, wherein the selecting the charge speed based on the user preference comprises selecting the charge speed using the user-selectable option.

29. The apparatus of claim 28, wherein the user-selectable option is provided upon determination that a battery charger is connected to the apparatus.

30. A non-transitory computer-readable medium storing computer executable code for battery charging by an apparatus, comprising code for:
determining a level of a charge current to be used during a charging mode for charging a battery based on a user preference;
determining a number of rest periods to be used during a charging mode based on the user preference, wherein during the rest periods, the apparatus is configured to perform at least one of setting the charge current to zero or discharging the battery; and
charging the battery with the determined level of the charge current and the determined number of rest periods;
wherein, when the determined level is a low level of the charge current, the charge current has one or more charge periods with a continuous current and has one or more rest periods,
wherein, when the determined level is a high level of the charge current, the number of the rest periods is determined to be zero.

* * * * *